United States Patent
Matthews et al.

(10) Patent No.: US 8,595,405 B2
(45) Date of Patent: Nov. 26, 2013

(54) SYSTEMS AND METHODS OF COMMUNICATIVELY COUPLING A HOST COMPUTING DEVICE AND A PERIPHERAL DEVICE

(75) Inventors: David L Matthews, Cypress, TX (US); Hubert E. Brinkmann, Spring, TX (US); Paul V. Brownnell, Houston, TX (US); Barry S. Basile, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 12/867,462

(22) PCT Filed: Feb. 18, 2008

(86) PCT No.: PCT/US2008/054201
§ 371 (c)(1),
(2), (4) Date: Aug. 12, 2010

(87) PCT Pub. No.: WO2009/105090
PCT Pub. Date: Aug. 27, 2009

(65) Prior Publication Data
US 2010/0325332 A1  Dec. 23, 2010

(51) Int. Cl.
G06F 13/36 (2006.01)
G06F 9/00 (2006.01)
G06F 15/177 (2006.01)

(52) U.S. Cl.
USPC ............................. 710/306; 713/2

(58) Field of Classification Search
USPC ............................. 710/306; 713/2
See application file for complete search history.

(56) References Cited

U.S. PATENT DOCUMENTS

| 5,371,878 A | 12/1994 | Coker |
| 5,860,083 A | 1/1999 | Sukegawa |
| 5,867,728 A | 2/1999 | Melo et al. |
| 6,212,589 B1 | 4/2001 | Hayek et al. |
| 6,279,060 B1 * | 8/2001 | Luke et al. ............ 710/64 |
| 6,321,276 B1 | 11/2001 | Forin |

(Continued)

FOREIGN PATENT DOCUMENTS

| EP | 0179425 | 5/1993 |
| JP | 3-019060 | 1/1991 |

(Continued)

OTHER PUBLICATIONS

Nazeem, A.; Reveliotis, S., "Efficient Enumeration of Minimal Unsafe States in Complex Resource Allocation Systems," Automation Science and Engineering, IEEE Transactions on , pp. 1,14.*

(Continued)

Primary Examiner — Faisal M Zaman

(57) ABSTRACT

A method includes providing a bridge device (105) connected to a host computing device (101-1, 101-2) and a peripheral device (103-1, 103-2, 103-N, 403-1, 403-2, 405-1, 405-2, 405-3), the bridge device (105) being configured to communicatively couple the host device (101-1, 101-2) to the peripheral device (103-1, 103-2, 103-N, 403-1, 403-2, 405-1, 405-2, 405-3); and preventing execution of a hardware enumeration process (313) in the host device (101-1, 101-2) until completion of a resource allocation process (303) in the bridge device (105).

18 Claims, 6 Drawing Sheets

(56) References Cited

U.S. PATENT DOCUMENTS

| | | | |
|---|---|---|---|
| 6,442,632 | B1 | 8/2002 | Hayek et al. |
| 6,539,491 | B1 * | 3/2003 | Skergan et al. ............... 713/500 |
| 6,665,263 | B1 * | 12/2003 | Kawabata et al. ............ 370/219 |
| 6,732,264 | B1 * | 5/2004 | Sun et al. ......................... 713/2 |
| 6,959,350 | B1 * | 10/2005 | Luke et al. .................... 710/104 |
| 7,634,621 | B1 * | 12/2009 | Coon et al. .................... 711/149 |
| 8,130,960 | B2 * | 3/2012 | Zimmer et al. ............... 380/277 |
| 2001/0027500 | A1 * | 10/2001 | Matsunaga ................... 710/104 |
| 2002/0129173 | A1 * | 9/2002 | Weber et al. .................. 709/310 |
| 2002/0147869 | A1 | 10/2002 | Owen et al. |
| 2002/0174229 | A1 | 11/2002 | Owen et al. |
| 2002/0178316 | A1 | 11/2002 | Schmisseur |
| 2002/0178317 | A1 * | 11/2002 | Schmisseur et al. .......... 710/305 |
| 2002/0188836 | A1 * | 12/2002 | Gurumoorthy et al. .......... 713/1 |
| 2003/0093510 | A1 * | 5/2003 | Cen ................................ 709/223 |
| 2004/0186905 | A1 * | 9/2004 | Young et al. .................. 709/225 |
| 2005/0083968 | A1 * | 4/2005 | Chan et al. .................... 370/466 |
| 2006/0143350 | A1 * | 6/2006 | Miloushev et al. ........... 710/242 |
| 2007/0030517 | A1 * | 2/2007 | Narayanan ................... 358/1.15 |
| 2007/0263642 | A1 * | 11/2007 | Harriman ...................... 370/401 |
| 2008/0005383 | A1 | 1/2008 | Bender et al. |
| 2008/0126735 | A1 * | 5/2008 | Kang ............................. 711/170 |
| 2008/0256351 | A1 * | 10/2008 | Natarajan ......................... 713/2 |
| 2008/0288671 | A1 * | 11/2008 | Masuda ........................... 710/38 |
| 2011/0004688 | A1 * | 1/2011 | Matthews et al. ............. 709/226 |

FOREIGN PATENT DOCUMENTS

| | | | | |
|---|---|---|---|---|
| JP | 04064142 A | * | 2/1992 | ................ G06F 9/46 |
| JP | 10-222453 | | 8/1998 | |
| JP | 2005100379 A | * | 4/2005 | ............ G06F 13/362 |
| JP | 2005149312 A | * | 6/2005 | ................ G06F 9/46 |
| JP | 2012124588 A | * | 6/2012 | ............ H04W 72/12 |
| KR | 10-2004-0031510 | | 11/2004 | |
| WO | WO-01-65365 | | 9/2001 | |
| WO | WO 2005/093577 | | 10/2005 | |

OTHER PUBLICATIONS

Internatonal Search Report and Written Opinion, dated Nov. 6, 2008, 10 pages.

* cited by examiner

SYSTEMS AND METHODS OF COMMUNICATIVELY COUPLING A HOST COMPUTING DEVICE AND A PERIPHERAL DEVICE

BACKGROUND

Networks have been used in conjunction with electronic devices for some time to facilitate the exchange of data and share resources among a plurality of the electronic devices communicatively coupled to a common exchange medium. In many systems, the use of a network may enable the efficient transfer of data between the electronic devices. Additionally, a network may make possible the sharing of peripheral devices among more than one of the electronic devices in the network.

Networks may be used to allow one or more host computing devices access to a plurality of shared, physically disaggregated peripheral devices. Particularly, in some systems the host computing devices and the shared peripheral devices may all be communicatively coupled to an intermediary bridge device, which allocates certain of the shared peripheral devices to one or more of the computing devices. Once the allocation process is complete, a data connection between selected shared peripheral devices and a corresponding computing device may be created by the bridge device.

In some cases, the bridge device may create a connection such that the selected peripheral devices interact with the host computing devices as if the shared peripheral devices resided physically on the host computing device. In such cases, a peripheral device may only be visible to a host computing device if the connection to the host computing device has been established prior to the host computing device executing a hardware enumeration process.

BRIEF DESCRIPTION OF THE DRAWINGS

The accompanying drawings illustrate various embodiments of the principles described herein and are a part of the specification. The illustrated embodiments are merely examples and do not limit the scope of the claims.

DETAILED DESCRIPTION

Figure 1:
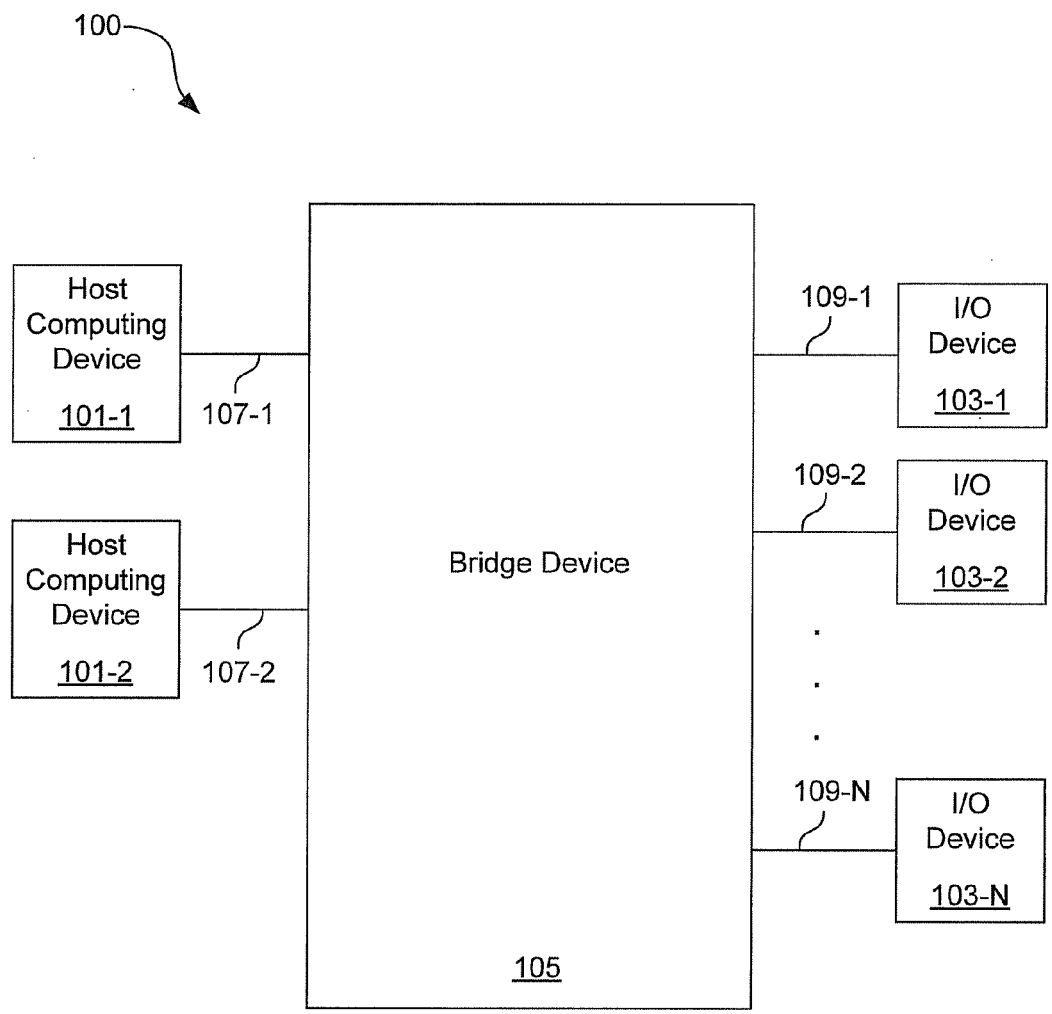
FIG. 1 is a block diagram of an illustrative system having a shared peripheral architecture according to principles described herein.

As described above, in some cases, a bridge device in a network may create a connection between one or more selected peripheral devices and a host computing device such that the selected peripheral devices interact with the host computing devices as if the shared peripheral devices resided physically on the host computing device. In such cases, the peripheral devices may only be visible to the host computing device if the connection between the peripheral device and the host computing device has been established prior to the host computing device executing a hardware enumeration process.

Unfortunately, in many such systems, if a host computing device were to enumerate its hardware before connections to the shared peripheral devices were established by the bridge device, the host computing device may not detect the shared peripheral devices allocated to it. Under such circumstances, the host computing device may remain oblivious to the availability of the allocated shared peripheral device or devices, thus potentially rendering the shared peripheral devices useless to that particular host computing device.

Moreover, a bridge device in such systems may be unable to allocate shared peripheral devices to a specific host computing device until after the shared peripheral devices have been successfully booted and detected by the bridge device. However, the shared peripheral devices may require varying amounts of time to boot. Furthermore, the bridge device may require time to perform the allocation process in which access to certain of the shared peripheral devices is granted to the host device. In systems where the host computing device, the bridge device, and the shared peripheral devices are powered on substantially simultaneously, the host computing device may perform a hardware enumeration process as part of a boot process before the bridge device is able to allocate access to one or more shared peripheral devices to the host computing device.

In some such host computing devices, the hardware enumeration process may occur primarily as the host computing device is booted. Thus, if the host computing device performs the hardware enumeration process before access to the shared peripheral devices are successfully allocated by the bridge to the host computing device, the host computing device may effectively be prevented from utilizing the shared peripheral devices provided.

To address these and other issues, the present specification discloses methods and systems that provide for a host computing device to execute a hardware enumeration process only after a resource allocation process has been executed in a bridge device. Using the methods and systems of the present disclosure, a host computing device may be enabled to discover shared peripheral devices allocated by the bridge device during the hardware enumeration process, thus enabling the host computing device to access the shared peripheral devices.

As used in the present specification and in the appended claims, the term "host computing device" refers to a computing device configured to interact with and/or control at least one peripheral device. Typically, the host computing device interacts with or controls the at least one peripheral device through a bridge device.

As used in the present specification and in the appended claims, the term "hardware enumeration process" refers to a series of instructions executed by a computing device in which hardware devices connected to the computing device are discovered and identified. Drivers or other code needed to interface with the hardware devices are also identified and loaded during the hardware enumeration process.

As used in the present specification and in the appended claims, the term "peripheral device" refers to an electronic device, separate and distinct from a central processing unit and physical memory of a host computing device, which is configured to provide the host computing device with one or more resources. For example, a peripheral device may provide input data to, or accept output data from, the host computing device.

As used in the present specification and in the appended claims, the term "bridge device" or "bridge" refers to a network device configured to communicatively couple at least one peripheral device to at least one host computing device. The communicative coupling created by the bridge device between peripheral device(s) and a corresponding host computing device may include one or more electrically conductive paths and/or a coupling implemented by software in which data is forwarded to a recipient through the bridge device.

As used in the present specification and in the appended claims, the term "resource allocation process" refers to a series of instructions executed by a bridge device that communicatively couple at least one shared peripheral device with at least one host computing device. As indicated, these communicative coupling may be implemented by hardware, firmware or software.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

Referring now to FIG. 1, an illustrative system (100) of networked electronic devices is shown. The system may include a plurality of host computing devices (101-1 and 101-2, collectively "the host computing devices 101"), a plurality of shared peripheral devices (103-1 through 103-N, collectively "the shared peripheral devices 103"), and a bridge device (105).

The host computing devices (101) may communicate with the bridge device (105) through network connections (107-1, 107-2). The host computing devices (101) may be connected directly to the bridge (105) with shared or individual connections. Alternatively, the host computing devices (101) may be connected to the bridge through a network. The network connections (107-1, 107-2) may be wired or wireless connections.

Similarly, each of the shared peripheral devices (103) may communicate with the bridge device (105) through network connections (109-1 through 109-N). The peripheral devices (103) may be connected directly to the bridge (105) with shared or individual connections. Alternatively, the peripheral devices (103) may be connected to the bridge through a network. The network connections (109-1 through 109-N) may be wired or wireless connections.

Each of the host computing devices (101) may include any computer hardware and/or instructions (e.g., software programs), or combination of software and hardware, configured to perform the processes for which they are intended. In particular, it should be understoodthat the host computing devices (101) may include any of a number of well-known computing devices, including, but not limited to, desktop computers, laptop computers, servers, personal digital assistants, and the like. These host computing devices (101) may employ any of a number of well-known computer operating systems, including, but not limited to, known versions and/or varieties of Microsoft™ Windows™, UNIX, Macintosh™, and Linux operating system software.

The peripheral devices (103) may be configured to provide data to, or accept data from, at least one of the host computing devices (101). Examples of suitable peripheral devices (103) that may be used in conjunction with the systems and methods of the present specification include, but are not limited to, printers, plotters, scanners, multi-function peripherals, projectors, multimedia devices, computing devices, storage media, disk arrays, network devices, pointing devices, and combinations thereof.

Although the peripheral devices (103) may be configured to directly interact with one or more of the host computing devices (101), as shown in the present example, the host computing devices (101) may not be directly coupled to any of the peripheral devices (103). In some embodiments, this may be due to the fact that the peripheral devices (103) are configured to be shared among a plurality of host computing devices (101). For example, both a first host computing device (101-1) and a second host computing device (101-2) may be configured to communicate with a single peripheral device (e.g., 103-1). Additionally or alternatively, the host computing devices (101) may not be directly coupled to individual peripheral devices (103) in order to simplify or reduce network wiring and/or other clutter associated with creating the connections.

In any event, the host computing devices (101) may be configured to communicate with selected peripheral devices (103) by means of the intermediate bridge device (105). Data from the host computing devices (101) intended for the peripheral devices (103) may be transmitted to the bridge device (105), where the data may then be transmitted to the appropriate peripheral device(s) (103). Likewise, data originating from the peripheral devices (103) intended for one or more of the host computing devices (101) may be transmitted to the bridge device (105), where the data may then be transmitted to the appropriate host computing device(s) (101).

The bridge device (105) may be configured to allow each of the host computing devices (101) access to certain of the shared peripheral devices (103). The peripheral devices (103) that each of the host computing devices (101) are permitted to access through the bridge device (105) may be determined by network configurations, user or machine profiles, programs installed on the host computing devices (101) or the bridge (105), and/or other factors.

The bridge device (105) is configured to selectively create virtual connections between the host computing devices (101) and the peripheral devices (103). Firmware on the bridge devices (105), in connection with the operation of the host computing devices (101), will facilitate the creation of these selective virtual connections.

Figure 2:
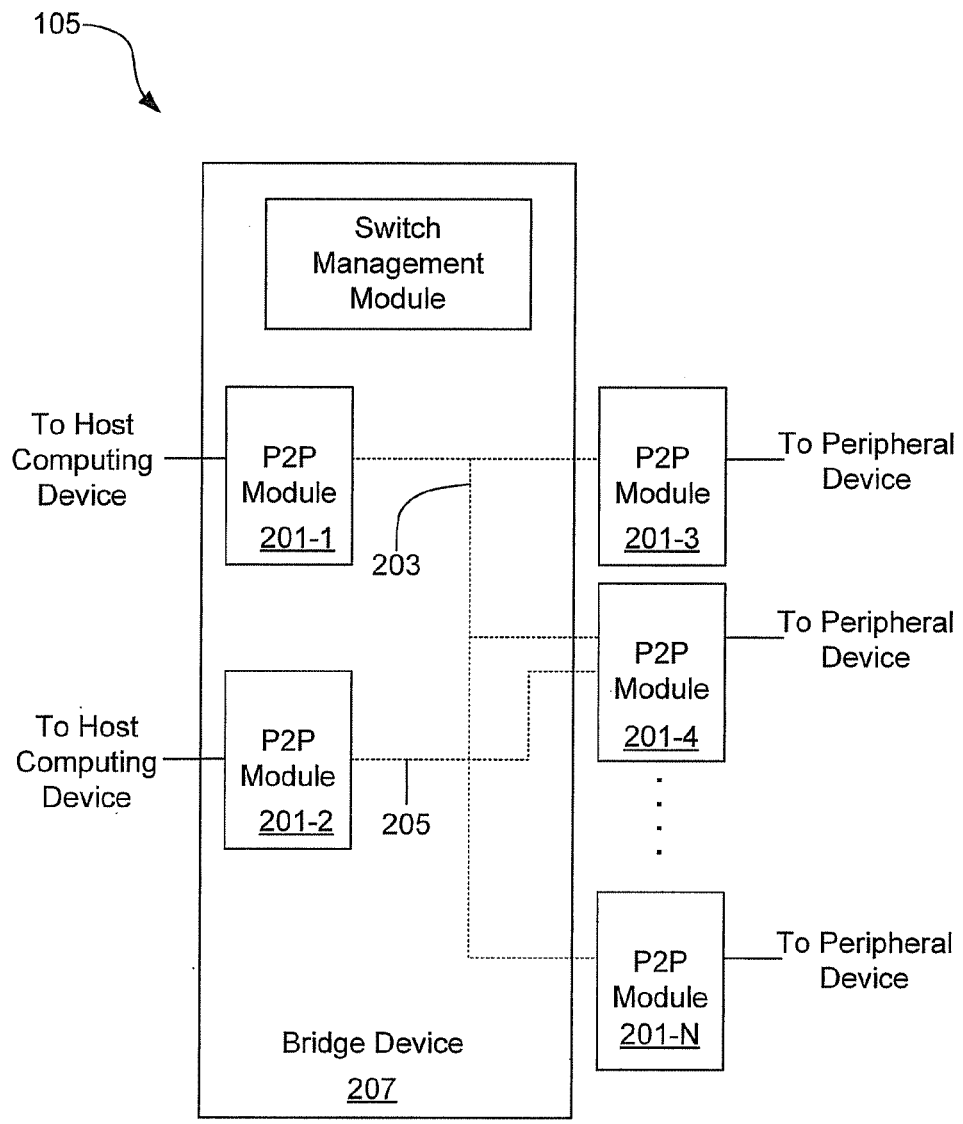
FIG. 2 is a block diagram of components in an illustrative network bridge device according to principles described herein.

Referring now to FIG. 2, a block diagram of an illustrative bridge device (105) is shown. As indicated, the bridge device (103) is configured to selectively establish virtual connections between any of the host computing devices (101, FIG. 1) and one or more of the peripheral devices (103, FIG. 1).

Many of the functional units described in the present specification have been labeled as "modules" in order to more particularly emphasize their implementation independence. For example, modules may be implemented in software for execution by various types of processors. An identified module may include executable code, for instance, one or more physical or logical blocks of computer instructions that may, for instance, be organized as an object, procedure, or function. Nevertheless, the executables of an identified module need not be physically located together, but may include disparate instructions stored in different locations which, when joined logically together, collectively form the module or module subsystem and achieve the stated purpose for the module. For example, a module of executable code could be a single instruction, or many instructions, and may even be distributed over several different code segments, among different programs, and across several memory devices. In other examples, modules may be implemented entirely in hardware, or in a combination of hardware and software.

In the present example, the virtual connections may be peer-to-peer network connections, and the bridge device (105) may include a plurality of peer-to-peer modules (201-1 to 201-N, collectively "201") configured to form virtual peer-to-peer network connections (203, 205) among each other. As each of the host computing devices (101, FIG. 1) and each of the peripheral devices (103, FIG. 1) may communicate with a peer-to-peer module (201-1 to 201-N) in the bridge device (105), the host computing devices (101, FIG. 1) and corresponding peripheral devices (103, FIG. 1) may be interconnected by operation of the peer-to-peer modules (201).

A switch management module (207) may be present in the bridge device (105) to determine which of the peripheral devices (103, FIG. 1) correspond to, or should be interfaced with, each of the host computing devices (101, FIG. 1). The switch management module (207) then establishes connections (e.g., 203, 205) among the corresponding peer-to-peer modules (201-1 to 201-5) to provide the desired connection between host computing devices (101, FIG. 1) and the various the peripheral devices (103, FIG. 1).

For example, in the present embodime, the switch management module (207) may determine that a first host computing device (e.g., 101-1, FIG. 1) is to have access to each of the peripheral devices (103, FIG. 1). Thus, switch management module (207) may communicatively couple the peer-to-peer module (201-1) configured to communicate with the first host computing device (101-1, FIG. 1) to each of the peer-to-peer modules (201-3 to 201-N) through connection (203). In this way, the first host computing device (101-1, FIG. 1) may have access to each of the peripheral devices (103, FIG. 1) through the bridge device (105).

Similarly, in the present embodiment, another peer-to-peer module (201-2) is configured to communicate with a second host computing device (e.g., 101-2, FIG. 1). In the illustrated example, this peer-to-peer module (201-2) is communicatively connected to only one other peer-to-peer module (201-4) that corresponds to a particular peripheral device (103-2). Accordingly, the second host computing device (103-2, FIG. 1) may have access to only that particular peripheral device (103-2, FIG. 1).

In some embodiments, the peripheral devices (103, FIG. 1) may be shared among all of the host computing devices (101, FIG. 1) such that each of the peer-to-peer modules (201) that corresponds to one of the host computing devices (101, FIG. 1) is communicatively coupled to each of the peer-to-peer modules (201) that correspond s to one of the peripheral devices (103, FIG. 1). As will be appreciated by those skilled in the art, any configuration of connections between host computing devices (101, FIG. 1) and peripheral devices (103, FIG. 1) may be created by the bridge (105).

As mentioned above, the switch management module (207) of the bridge device (105) is configured to perform a resource allocation process before communicatively coupling peer-to-peer modules (201) to each other. In the resource allocation process, a series of instructions may be executed by the bridge device (105) that determines which, if any, of the peripheral devices (103, FIG. 1) are to be communicatively coupled to each of the host computing devices (101, FIG. 1). To conclude the resource allocation process, the coupling or creation of real or virtual connections between the host computing devices (101, FIG. 1) and corresponding allocated peripheral devices (103, FIG. 1) is completed. As also mentioned above, the host computing devices (101, FIG. 1) may then be able to detect and communicate with their allocated peripheral devices (103, FIG. 1) through a resource enumeration process.

To successfully perform the resource allocation process, the bridge device (105) needs to detect and communicate with each of the peripheral devices (103, FIG. 1). For example, after the peripheral devices (103, FIG. 1) and the bridge device (105) are powered up, the bridge device (105) may wait a sufficient amount of time for the peripheral devices (103, FIG. 1) to successfully boot before performing the resource allocation process.

However, in the event that one of the host computing devices (101, FIG. 1) performs a hardware enumeration process before the switch management module (207) of the bridge device (105) has been able to perform the resource allocation process, the host computing device (101, FIG. 1) may not subsequently detect or communicate with peripheral devices (103, FIG. 1) to which access has been granted and enabled by the bridge device (105). To avoid such situations, the bridge device (105) may be configured to prevent one or more of the host computing devices (101, FIG. 1) from performing a hardware enumeration process prior to completion of the resource allocation process within the bridge device (105). This may be done by stalling the host computing devices (101, FIG. 1) from initiating the hardware enumeration process during booting until after the bridge device (105) has confirmed that its own resource detection and allocation processes have been performed.

Figure 3:
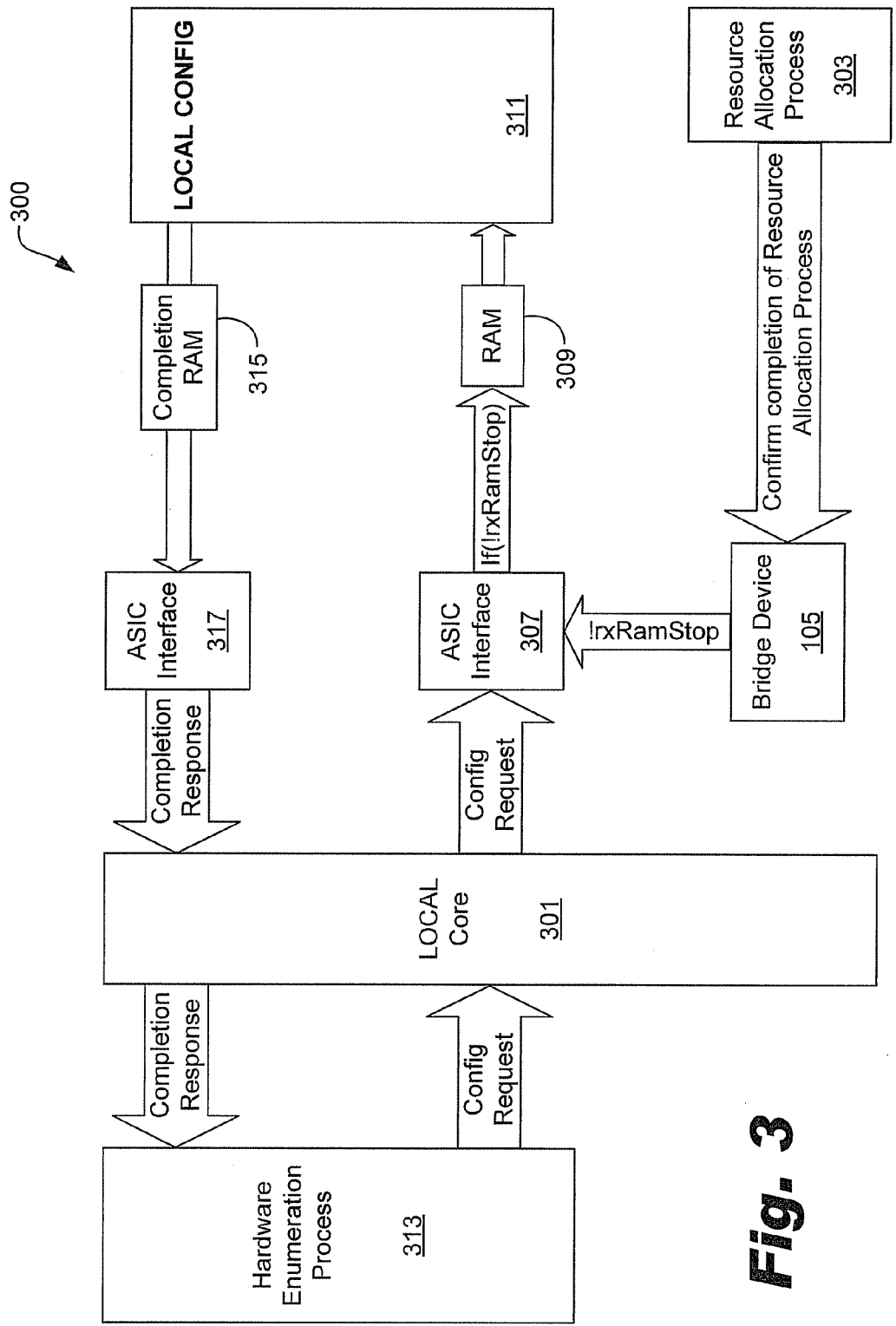
FIG. 3 is a diagram of an illustrative configuration sequence in a system having a shared peripheral architecture according to principles described herein.

Referring now to FIG. 3, a diagram is shown of an illustrative configuration process (300) that may be performed by an operating system in an illustrative host computing device (101, FIG. 1). In the configuration process (300), the bridge device (105) is configured to delay the operating system on one or more host computing devices from detecting virtual devices through a hardware enumeration process before the bridge device (105) has performed a resource allocation process.

In the diagram, each block represents a configuration module having one or more configuration tasks that must be completed before progressing to a subsequent configuration module or terminating the configuration process (300). The flow of the configuration process (300) in the present example may be governed by a local core (301) of the host computing device (101, FIG. 1). The local core (301) may progress through subsequent modules in the configuration process (300) as confirmation is received from the modules that each required step been completed successfully. All of the processes or components illustrated in FIG. 3 are resident in the host computing device except the bridge device (105) and its resource allocation process (303).

In the configuration process (300), the local core (301) may initiate the configuration process (Config Request) as part of the boot process using an application-specific integrated circuit (ASIC) interface module (307). The ASIC interface module (307) in the host computing device may include an interface to the bridge device (105).

Concurrently, a resource allocation process (303) in the bridge device (105) may begin, or have already begun. The bridge device (105) will monitor for confirmation of the completion of the resource allocation process (303) as indicated by the arrow from the resource allocation process (303) to the bridge device (105).

The ASIC interface module (307) may prevent flow in the configuration process (300) from being transferred to a subsequent module until after the resource allocation process (303) has been performed by the bridge device (105), thus preventing a hardware enumeration process (313) from being commenced before peripheral devices have been allocated to the host computing device by the bridge device (105). This prevention may be accomplished by the ASIC interface module (307) delaying a configuration completion response to the local core (301) as long as an indicator (e.g. RamStop) is provided to the ASIC Interface module (307) by the bridge device (105) that the resource allocation process (303) has not been completed.

Once the resource allocation process has been completed, the bridge device (105) may remove the indicator (RamStop) from the ASIC interface module (307). If the ASIC interface module (307) determines that the indicator (RamStop) is no longer present, the ASIC interface module (307) will allow the configuration flow to proceed to the RAM module (309).

After the necessary configuration tasks have been completed in the RAM module (309), configuration flow may be transferred to the local configuration module (311). As the resource allocation process (303) has have been performed prior to flow being transferred to the local configuration module (311), all of the peripheral devices allocated to the host computing device by the bridge device (105) should be available for detection by the host computing device during the hardware enumeration process (313), in addition to local peripheral devices that may already be connected to the host computing device.

Flow may then be transferred to a completion RAM module (315), back to an ASIC interface module (317), and back to the local core (301). The hardware enumeration process (313) may then be executed following the completion of the resource allocation process (303) of the bridge device (105).

Figure 4A:
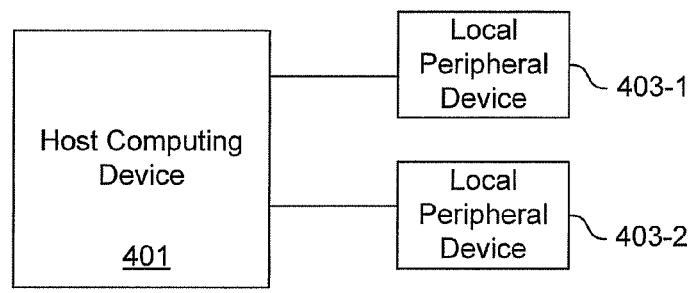
FIG. 4A is a block diagram of peripheral devices detectable by an illustrative host device prior to completion of a configuration sequence according to principles described herein.
Figure 4B:
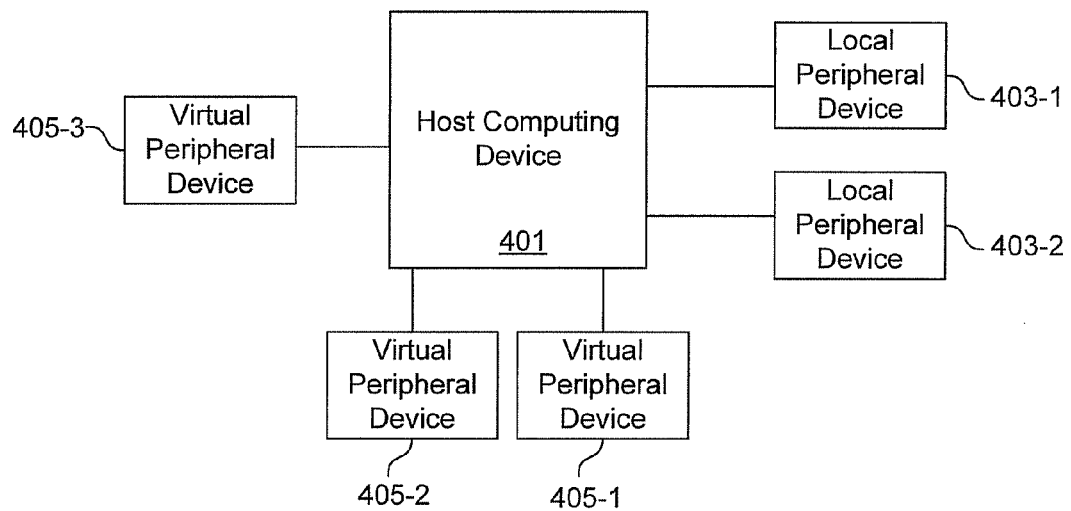
FIG. 4B is a block diagram of illustrative peripheral devices available to the illustrative host device of FIG. 4A after a configuration sequence according to principles described herein.

Some of the beneficial effects of this flow can be understood with reference to FIGS. 4A and 4B. As used herein, the term "virtual peripheral device" is used to refer to a peripheral device that is selectively available to a host computing device through a bridge. This is opposed to a "local peripheral device" that is always available to a host computing device without allocation by a bridge device.

Referring now to FIG. 4A, a block diagram of peripheral devices (403-1, 403-2) detectable by an illustrative host computing device (401) prior to completion of the resource allocation process (303, FIG. 3) by the bridge device (105, FIG. 1) is shown. As illustrated, only local peripheral devices (403-1, 403-2) that are connected to the host computing device (401) may be visible to the host computing device before the resource allocation process (303, FIG. 3), according to principles described herein.

Referring now to FIG. 4B, a block diagram of peripheral devices (403-1 and 403-2, 405-1 to 405-3) detectable by the illustrative host computing device (401) after the completion of the resource allocation process (303, FIG. 3) is shown. As illustrated, both local peripheral devices (403-1, 403-2) and virtual peripheral devices (405-1 to 405-3) allocated by the bridge device (105, FIG. 1) to the host computing device (401) may be detectable by the host computing device (401). Thus, as explained above, it may be desirable to provide for the host computing device (401) to initiate a hardware enumeration process (313, FIG. 3) only after the resource allocation process (303, FIG. 3) has been performed by the bridge device (105, FIG. 1).

Illustrative Methods

Figure 5:
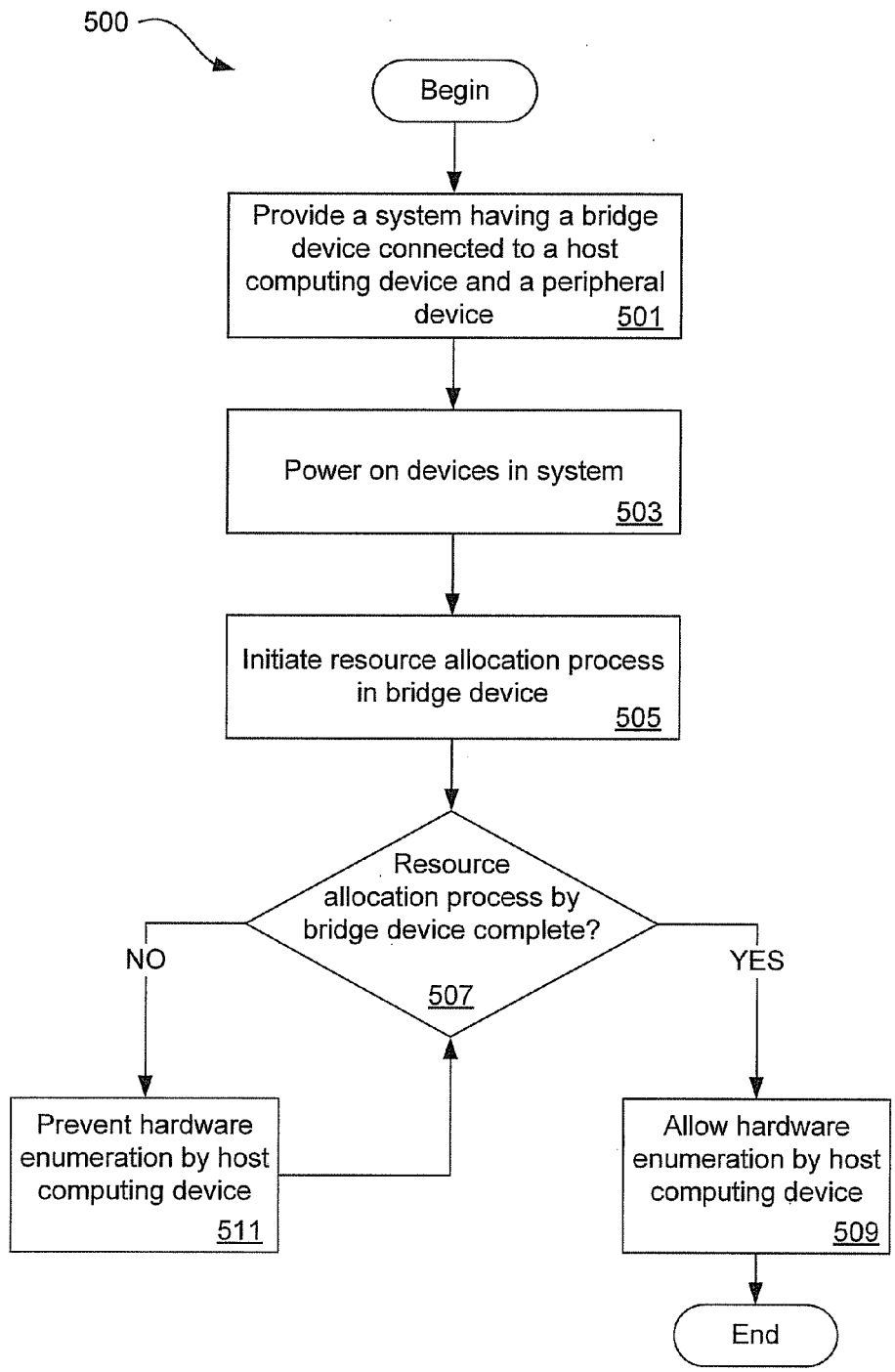
FIG. 5 is a flowchart diagram of an illustrative method of booting a host operating system in a system having a shared peripheral architecture according to principles described herein

Referring now to FIG. 5, a block diagram is shown of an illustrative method (500) consistent with the principles described herein.

In the method (500), a system is provided (step 501) having a bridge device connected to at least one host computing device and at least one peripheral device. The bridge device may be configured to communicatively couple the host device to the peripheral device.

As described herein, in various embodiments, the bridge device may be configured to provide a virtual peer-to-peer connection between a host device and a peripheral device. Additionally, in some embodiments, the bridge device may be configured to provide the host device with access to a plurality of peripheral devices.

The devices in the system may then be powered on (step 503), and begin booting. A resource allocation process may be initiated (step 505) in the bridge device after the peripheral device has booted.

If it is determined (decision 507) that the resource allocation process by the bridge device is complete, a hardware enumeration process by the host computing device may be initiated (step 509).

If it is determined (decision 507) that the resource allocation process by the bridge device is not complete, the host computing device may be prevented (step 511) from initiating the hardware enumeration process until it is determined (decision 507) that the resource allocation process by the bridge device is complete.

In some embodiments, the hardware enumeration process may be prevented by the bridge device during a configuration process performed by the host computing device as described above in connection with FIG. 3. This may include the bridge device delaying a response to a configuration request by the host computing device until the resource allocation process by the bridge device has been completed.

Figure 6:
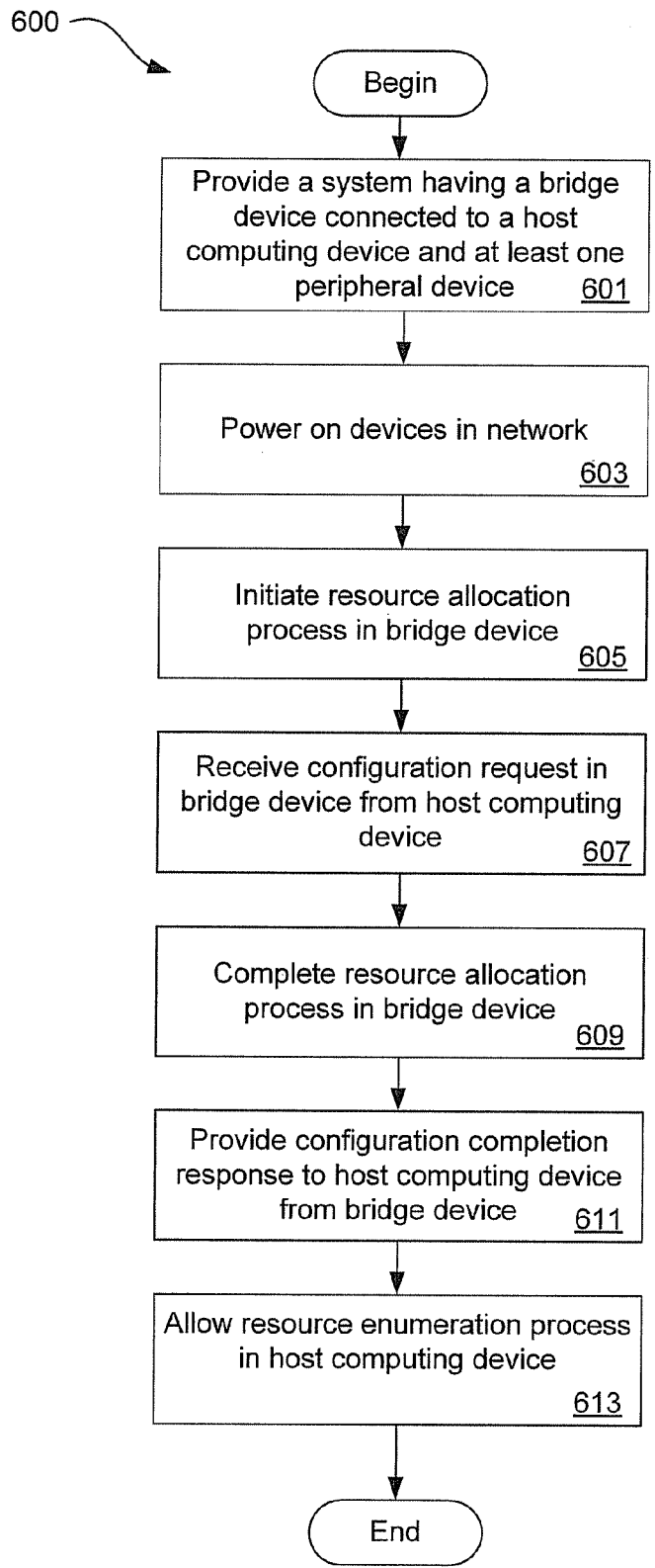
FIG. 6 is a flowchart diagram of an illustrative method of booting a host operating system in a system having a shared peripheral architecture according to principles described herein Throughout the drawings, identical reference numbers designate similar, but not necessarily identical, elements.

Referring now to FIG. 6, a block diagram is shown of another illustrative method (600) consistent with the principles described herein.

In this method (600), a system may be provided (step 601) having a bridge device connected to a host computing device and at least one peripheral device. Similar to the method (500, FIG. 5) described above, the bridge device may be configured to communicatively couple the host device to the peripheral device. In some embodiments, the bridge device may be configured to provide a virtual peer-to-peer connection between the host device and the peripheral device. Additionally, in some embodiments the bridge device may be configured to provide the host device access to a plurality of peripheral devices.

The devices in the system may then be powered on (step 603), and begin booting. A resource allocation process may be initiated (step 605) in the bridge device after the peripheral device(s) have been booted.

A configuration request may then be received (step 607) in the bridge device from the host computing device, and a configuration completion response provided (step 611) to the host computing device from the bridge device only after the bridge device has completed (step 609) the resource allocation process. The host computing device may then execute (step 613) the resource enumeration process.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method, comprising:
providing a bridge device connected to a host computing device and a peripheral device, said bridge device being configured to communicatively couple said host device to said peripheral device; and
preventing execution of a hardware enumeration process in said host device until completion of a resource allocation process in said bridge device;
in which preventing execution of a hardware enumeration process comprises preventing the transfer of a configuration process until an application-specific integrated circuit (ASIC) interface module associated with the host computing device fails to receive an indicator from the bridge device.

2. The method of claim 1, in which said bridge device is configured to provide a virtual peer-to-peer connection between said host device and said peripheral device.

3. The method of claim 1, further comprising booting said peripheral device prior to said resource allocation process in said bridge device.

4. The method of claim 1, in which said hardware enumeration process is prevented by said bridge device during a configuration process performed by said host computing device.

5. The method of claim 4, in which said configuration process is performed by said host computing device at least when said host computing device is booted.

6. The method of claim 4, in which said hardware enumeration process is prevented by said bridge device delaying a response to a configuration request by said host computing device.

7. The method of claim 1, further comprising executing said hardware enumeration process in said host device after said completion of said resource allocation process in said bridge device.

8. A method, comprising:
beginning a resource allocation process in a bridge device;
receiving a configuration request from a host computing device in communication with said bridge device;
providing a configuration completion response to said host computing device only after said resource allocation process has been completed; and
executing a hardware enumeration process in said host device after said completion of said resource allocation process in said bridge device; the enumeration process being prevented by said bridge device delaying a response to a configuration request by said host computing device;
in which the host computing device comprises an application-specific integrated circuit (ASIC) interface module and in which preventing the enumeration process by said bridge device delaying a response to a configuration request by said host computing device comprises preventing the transfer of a configuration process until the ASIC interface module fails to receive a RamStop indicator from the bridge device.

9. The method of claim 8, in which said resource allocation process comprises providing a virtual peer-to-peer connection between said host computing device and at least one peripheral device.

10. The method of claim 9, in which said peripheral device is selected from the group consisting of: printers, plotters, scanners, multi-function peripherals, projectors, multimedia devices, computing devices, storage media, disk arrays, network devices, pointing devices, and combinations thereof.

11. The method of claim 9, in which said resource allocation process further comprises determining which of a plurality of shared peripheral devices correspond to said host computing device.

12. The method of claim 8, further comprising booting said peripheral device prior to said resource allocation process in said bridge device.

13. The method of claim 8, in which said configuration completion response is provided to said host computing device by said bridge device after said resource allocation process has been completed.

14. A system, comprising:
a host computing device;
at least one peripheral device;
a bridge device coupled to said host computing device and said at least one peripheral device; and
an application-specific integrated circuit (ASIC) interface module;
in which said bridge device is configured to make said peripheral device available to said host computing device prior to said host device executing a hardware enumeration process;
in which said bridge device is configured to prevent said host computing device from executing said hardware enumeration process by delaying a response requested by said host computing device; and
in which preventing said host computing device from executing said hardware enumeration process further comprises preventing the transfer of a configuration process by said host computing device until said ASIC interface module fails to receive a RamStop indicator from said bridge device.

15. The system of claim 14, wherein said bridge device is configured to establish a virtual peer-to-peer connection between said host device and said at least one peripheral device.

16. The system of claim 15, in which said bridge device is configured to make said peripheral device available to a plurality of host computing devices.

17. The system of claim 15, in which said peripheral device is selected from the group consisting of: printers, plotters, scanners, multi-function peripherals, projectors, multimedia devices, computing devices, storage media, disk arrays, network devices, pointing devices, and combinations thereof.

18. The system of claim 14, in which said bridge device is configured to prevent said host device from executing said hardware enumeration process prior to said bridge device making said peripheral device available to said host device.

* * * * *